US007648785B2

(12) United States Patent
Hu et al.

(10) Patent No.: US 7,648,785 B2
(45) Date of Patent: Jan. 19, 2010

(54) CLEAN POWER SYSTEM

(75) Inventors: Haoran Hu, Novi, MI (US); Thomas Stover, Milford, MI (US); Timothy J. Morscheck, Portage, MI (US); Kathryn A. Miles, Freemont, IN (US); Patrick M. Watts, Gastonia, NC (US); Diane C. Wiersma, Caledonia, MI (US)

(73) Assignee: Eaton Corporation, Cleveland, OH (US)

( * ) Notice: Subject to any disclaimer, the term of this patent is extended or adjusted under 35 U.S.C. 154(b) by 716 days.

(21) Appl. No.: 10/943,477

(22) Filed: Sep. 17, 2004

(65) Prior Publication Data

US 2006/0063046 A1 Mar. 23, 2006

(51) Int. Cl.
*H01M 8/06* (2006.01)
*H01M 8/10* (2006.01)
*F01N 3/10* (2006.01)

(52) U.S. Cl. .............................. 429/17; 429/19; 429/30; 60/273; 60/299

(58) Field of Classification Search ....................... None
See application file for complete search history.

(56) References Cited

U.S. PATENT DOCUMENTS

| | | | |
|---|---|---|---|
| 3,948,223 A * | 4/1976 | Benson | 122/240.2 |
| 4,108,114 A | 8/1978 | Kosaka et al. | |
| 5,185,311 A * | 2/1993 | Tabata et al. | 502/304 |
| 5,339,634 A | 8/1994 | Gale et al. | |
| 5,678,647 A | 10/1997 | Wolfe et al. | |
| 5,858,568 A | 1/1999 | Hsu et al. | |
| 5,950,752 A | 9/1999 | Lyons | |
| 6,051,123 A | 4/2000 | Joshi et al. | |
| 6,124,054 A | 9/2000 | Gorman et al. | |
| 6,213,234 B1 | 4/2001 | Rosen et al. | |
| 6,230,494 B1 * | 5/2001 | Botti et al. | 60/649 |
| 6,276,473 B1 * | 8/2001 | Zur Megede | 180/65.25 |
| 6,365,290 B1 | 4/2002 | Ghezel-Ayagh et al. | |
| 6,558,831 B1 * | 5/2003 | Doshi et al. | 429/30 |

(Continued)

OTHER PUBLICATIONS

AEI-Booking Joint Center For Regulatory Studies, Control of Emission of Air Pollution from 2004 and Later Model Year Heavy-Duty Highway Engines and Vehicles; Revision of Light-Duty On-Board Diagnostic Requirements, Preliminary Regulatory Impact Analysis, 65 Federal Register 59896, Oct. 6, 2006.*

(Continued)

*Primary Examiner*—Dah-Wei D Yuan
*Assistant Examiner*—Katherine Turner
(74) *Attorney, Agent, or Firm*—Paul V. Keller

(57) ABSTRACT

One aspect of the invention relates to a clean power generation system in which an internal combustion engine is operated to produce shaft power and an exhaust stream. The exhaust stream is processed by a fuel cell. Fluctuations in power demand are met, at least in part, by increasing or decreasing power output from the fuel cell and/or power uptake or output from a power storage device. The engine can operate at a relatively constant rate, providing a steady exhaust stream, which facilitates pollution control and fuel cell operation. According to another aspect of the invention, the exhaust of an engine is treated with a fuel cell having an electrolyte that conducts protons. In addition to removing pollutants from the exhaust while generating useful power, the fuel cell can provide a supply of low acidity water. The water can be used in the fuel reformer.

22 Claims, 1 Drawing Sheet

U.S. PATENT DOCUMENTS

| | | | |
|---|---|---|---|
| 6,609,582 | B1 | 8/2003 | Botti et al. |
| 6,651,432 | B1 * | 11/2003 | Gray, Jr. .................... 60/605.2 |
| 6,655,130 | B1 | 12/2003 | Kirwan et al. |
| 6,655,325 | B1 | 12/2003 | Botti et al. |
| 6,763,799 | B2 | 7/2004 | Ito et al. |
| 6,994,930 | B1 | 2/2006 | Geisbrecht et al. |
| 7,246,485 | B2 | 7/2007 | Ohki et al. |
| 2002/0148221 | A1 | 10/2002 | Jagtoyen et al. |
| 2003/0066286 | A1 * | 4/2003 | Murata et al. ................. 60/284 |
| 2003/0141122 | A1 | 7/2003 | Boll et al. |
| 2004/0055586 | A1 | 3/2004 | Botti et al. |
| 2004/0062968 | A1 | 4/2004 | Tanner |
| 2004/0177607 | A1 | 9/2004 | Suzuki et al. |
| 2005/0022450 | A1 | 2/2005 | Tan et al. |
| 2005/0188702 | A1 * | 9/2005 | Bachovchin et al. .......... 60/776 |

OTHER PUBLICATIONS

The above reference may be found online at: http://aei-brookings.org/admin/authorpdfs/redirect-safely.php?fname=../pdffiles/2060-AI12.PRIA.pdf.*

"JC" AEI-Booking Joint Center For Regulatory Studies, Control of Emission of Air Pollution from 2004 and Later Model Year Heavy-Duty Highway Engines and Vehicles; Revision of Light-Duty On-Board Diagnostic Requirements, Preliminary Regulatory Impact Analysis, 65 Federal Register 59896, Oct. 6, 2006.*

The above reference may be found online at: http://aei-brookings.org/admin/authorpdfs/redirect-safely.php?fname=../pdffiles/2060-AI12.PRIA.pdf.*

Sasaki et al., *Mechanism of the Smokeless Rich Diesel Combustion by Reducing Temperature*, SAE 2001-01-0655 (2001).

Goddard III, et al. "Enhanced Power Stability for Proton Conducting Solid Oxide Fuel Cells", 2003 Fuel Cell Annual Report.

* cited by examiner

CLEAN POWER SYSTEM

FIELD OF THE INVENTION

The present invention relates to power generation systems generally, and to low-emission diesel-fueled systems in particular.

BACKGROUND OF THE INVENTION $NO_x$ emissions from vehicles with internal combustion engines are an environmental problem recognized worldwide. Several countries, including the United States, have long had regulations pending that will limit $NO_x$ emissions from vehicles. Manufacturers and researchers have put considerable effort toward meeting those regulations. $NO_x$ emissions can be controlled in conventional gasoline powered vehicles, which use stoichiometric fuel-air mixtures, by three-way catalysts. In the absence of oxygen, three-way catalysts reduce NOx by reaction with CO and unburned hydrocarbons. In diesel powered vehicles and lien burn gasoline engines, however, the exhaust is too oxygen-rich for three-way catalysts to be effective.

Several solutions have been proposed for controlling NOx emissions in diesel-powered vehicles. One set of approaches focuses on the engine. NOx is generated primarily at high temperatures. By limiting the adiabatic flame temperature, through exhaust gas recirculation (EGR) for example, NOx production can be reduced. Lowering the adiabatic flame temperature to eliminate NOx production, however, causes engine efficiency to decrease and smoke to appear in the exhaust. It is commonly believed that there is a trade-off between NOx production and particulate matter production in diesel engines. It is less well known that if the adiabatic flame temperature is dropped sufficiently, particulate matter production will also decrease. In any event, clean combustion cannot be achieved solely by varying the adiabatic flame temperature at which a diesel engine operates.

One way to reduce total combustion byproducts is to homogenize fuel air mixtures in diesel engines. This can be accomplished by mixing fuel with air prior to injection or injecting all or part of the fuel into an engine cylinder before or early in a compression stroke. While studies show a reduction in emissions, this approach has not been proven commercially and does not eliminate diesel combustion byproducts altogether.

Another set of approaches remove NOx from the vehicle exhaust. These include the use of lean-burn $NO_x$ catalysts, $NO_x$ adsorber-catalysts, and selective catalytic reduction (SCR). Lean-burn NOx catalysts promote the reduction of $NO_x$ under oxygen-rich conditions. Reduction of NOx in an oxidizing atmosphere is difficult. It has proved challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. Lean burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiency with lean-burn catalysts is unacceptably low.

NOx adsorber-catalysts alternately adsorb NOx and catalytically reduce it. The adsorber can be taken offline during regeneration and a reducing atmosphere provided. The adsorbant is generally an alkaline earth oxide adsorbant; such as $BaCO_3$ and the catalyst can be a precious metal, such as Ru.

SCR involves using ammonia as the reductant. The NOx can be temporarily stored in an adsorbant or ammonia can be fed continuously into the exhaust. SCR can achieve NOx reductions in excess of 90%, however, there is concern over the lack of infrastructure for distributing ammonia or a suitable precursor. SCR also raises concerns relating to the possible release of ammonia into the environment.

An alternative approach to reducing emissions is to convert the chemical energy of the fuel into electrical energy using a fuel cell. Fuel cells are not very effective at extracting power from long chain hydrocarbons, but fuel reformers can be used to break long chain hydrocarbons into smaller more reactive molecules such as short chain hydrocarbons, oxygenated hydrocarbons, hydrogen, and carbon monoxide, which are suitable fuels for a fuel cell. For example, U.S. Pat. No. 5,678,647 suggests powering a fuel cell for a vehicle drive system using a conventional fuel processed through a reformer. The reformer and the fuel cell must be heated before they are operative to produce useful power.

U.S. Pat. No. 6,276,473 describes a hybrid power generation system comprising an engine, a fuel reformer, and a fuel cell. The engine is used to provide cold start-power and the engine's exhaust is used to heat the fuel reformer and the fuel cell. When the reformer and fuel cell reach their operating temperatures, the reformer/fuel cell system begins to produce power. The engine can continue to operate after warm-up or be turned off.

U.S. Pat. No. 6,655,325 describes a power generation system comprising an internal combustion engine and a fuel cell. The engine can operate as a reformer and provides fuel for the fuel cell. The engine can also provide shaft power, or alternatively all the shaft power can be derived from the fuel cell. Particulate matter in the engine exhaust is said to be removed by the fuel cell and a catalytic converter. It is also suggested that by treating the fuel cell exhaust with a catalytic converter, near zero emissions of hydrocarbons and nitric oxide can be achieved.

In spite of progress, there remains a long felt need for environmentally friendly, efficient, and reliable power generation systems for vehicles.

SUMMARY OF THE INVENTION

The following presents a simplified summary in order to provide a basic understanding of some aspects of the invention. This summary is not an extensive overview of the invention. The primary purpose of this summary is to present some concepts of the invention in a simplified form as a prelude to the more detailed description that is presented later.

The present invention relates to vehicle power generation systems that use fuel cells. One aspect of the invention relates to a power generation system in which an internal combustion engine is operated to produce shaft power and an exhaust stream. A fuel cell is used to treat the exhaust stream. Fluctuations in power demand are met, at least in part, by increasing or decreasing power output from the fuel cell and/or power uptake or output from one or more power storage devices. This stabilizes the engine operation and the properties of the exhaust stream. Stabilizing the exhaust stream facilitates treating the exhaust for pollution control. Stabilizing the exhaust stream also facilitate operating a fuel cell using the exhaust as fuel. A power generation system according to this aspect for the invention can be configured to meet virtually any emission control regulation.

While the fuel cell can produce useful power from the engine exhaust, the fuel cell can also be provided with another fuel source. Another fuel source could be a fuel reformer or engine fuel injected directly into the exhaust. According to a further aspect of the invention, the exhaust of an engine is treated with a fuel cell having an electrolyte that conducts protons. In addition to removing pollutants from the exhaust while generating useful power, the fuel cell can provide a supply of low acidity water. The water can be used in reformering fuel for the fuel cell. The fuel can be reformed in the fuel cell itself, or in a separate reformer.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
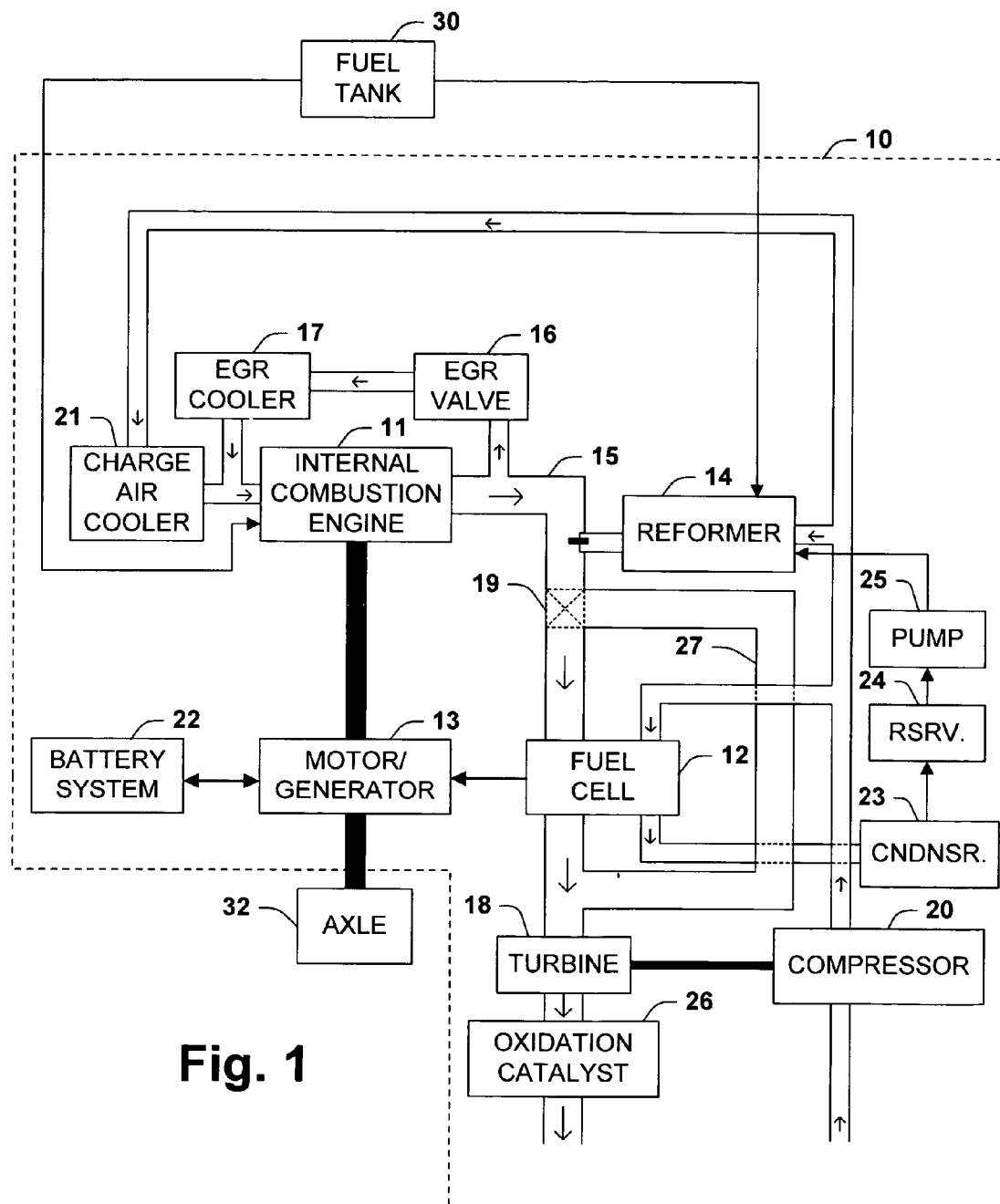
FIG. 1 is a schematic illustration of a power generation system exemplifying several aspects of the present invention.

FIG. 1 is a schematic illustration of a power generation system 10 exemplifying several aspects of the present invention. The power generation system 10 comprises an internal combustion engine 11, a fuel cell 12, a motor/generator 13, and a fuel reformer 14. The power generation system 10 is designed to couple with a fuel tank 30 and a vehicle axle 32. The power generation system 10 provides shaft power to the axle 32.

The system 10 is preferably adapted to provide power in response to demands from a user. Power demands include both demands for shaft power and demands for electrical power, such as demands for electricity to power vehicle accessories. Preferably, the system can generate power at one rate while exporting power at a second rate. Generated power in excess of demand can be stored by one or more energy storage devices, such as a battery system 22.

Demands for shaft power can be met by drawing power from one or more of the internal combustion engine 11, the fuel cell 12, or the battery system 22. Mechanical energy from the engine 11 can be used directly to drive the axle 32. Electrical energy from the fuel cell 12 and/or the battery system 22 can be converted to shaft power by the motor/generator 13.

The motor/generator 13 can also be used to convert mechanical energy into electrical energy. The mechanical energy can come from the engine 11. Alternatively, the mechanical energy can be drawn from outside the system 10 through the vehicle axle 32. In particular, the motor/generator 13 can apply a braking force on the axle 32 and convert a vehicles kinetic energy into storable electrical energy (regenerative braking).

For limited periods of time, the system 10 can export more power than it is producing. In such a case, the power storage device is draining. If the excess of demand over production is expected to be temporary, or if storage capacity is deemed sufficient, the power production rate can be kept constant. Alternatively, the rate of power production can be increased by supplying more fuel to the engine 11 or supplying additional fuel directly (not through the engine) to the fuel cell 12.

According to one aspect of the invention, all or part of variations in demand on the system 10 for shaft power are met by varying the supply rate of fuel, other than engine exhaust, to the fuel cell 12 and/or varying the rate of uptake or output of energy to one or more power storage devices in a manner that reduces or eliminates the impact of the varying demand on operation of the engine 11. In a conventional power generation system, changes in demand for shaft power are met by varying the fuel supply to an internal combustion engine. Meeting fluctuations in power demand entirely or in part using the fuel cell 12 and/or a power storage device stabilizes the operation of the engine 11 in comparison to an engine in a conventional system and can allow the engine 11 to be run at a relatively constant rate.

There are several advantages to running the engine 11 at a relatively constant rate. First, a smaller engine running at a constant rate can provide as much total energy as a larger engine running at a variable rate. Therefore, the engine 11 can be smaller, lighter, and less expensive. Constant speed also facilitates keeping the engine in a particular mode of operation, such as the low temperature combustion discussed below.

Second, it is much easier to treat the engine exhaust to remove pollutants when the exhaust has a constant or narrowly varying flow rate, temperature, and composition. In a typical vehicle power generation system, the exhaust flow rate varies over orders of magnitude and the exhaust temperature varies by hundreds of degrees. These variations place a heavy burden on pollution control devices, a burden that is mitigated by the present invention. Preferably, the exhaust temperature is constrained to remain, after warm-up, within a range of about 100° C., more preferably within a range of about 60° C. Preferably the engine exhaust flow rate, while the engine is running after warm-up, varies by no more than about a factor of three, more preferably by no more than a factor of two.

Third, stability in exhaust flow rate, temperature, and composition facilitates the efficient operation of the fuel cell 12 using the exhaust as fuel. Reducing the peak flow rate reduces the required size of the fuel cell 12. Stability in the exhaust stream also simplifies control over the supply of oxygen to the fuel cell 12, which is particularly significant when an expensive oxygen source, such as compressed air or concentrated oxygen is used to increase the efficiency of the fuel cell 12. Finally, stability in the exhaust stream simplifies temperature regulation of the fuel cell 12.

Responding to fluctuations in power demand by using the fuel cell 12 and/or a power storage device is not exclusive of any variation in engine operation. For example, the engine may be shut off entirely if power demand is less than production and the system has reached its storage capacity. The engine power output may also vary without shutting down, although such variation are significantly less than if the engine were meeting fluctuations in power demand on its own.

Any suitable control strategy can be used for the engine 11 in connection with the foregoing objectives. For example, the control strategy can be designed to minimize changes in engine power output or limit changes in engine power output according to constraints on one or more of exhaust temperature, exhaust composition, or exhaust flow rate. Alternatively, increases and decreases in engine power output can be based on estimates of the amount of power stored in a power storage system. Combinations of the foregoing and other control strategies can also be used.

Where for extended periods of time the total power demand on the power generation system 10 exceeds the power output of the engine 11 and the power output of the fuel cell 12 fueled by engine exhaust, it may be desirable to provide additional fuel for the fuel cell 12 to meet that demand. Additional fuel can be provided in the power generation system 10 by reforming fuel from the fuel tank 30 in the fuel reformer 14 and injecting this fuel into the conduit 15. The reformate reacts in the fuel cell 12 to provide additional power. Optionally, the fuel reformer 14 can be eliminated; fuel can be reformed in the fuel cell 12 if the fuel cell 12 is operating at a high enough temperature. Most fuels can be reformed at temperatures at or above about 600-650° C.

Providing an alternate fuel source for the fuel cell 12 also provides the advantage of allowing the fuel cell 12 to operate independently of the engine 11. The engine 11 can be shut down completely when sufficient power is available from other sources.

A battery system is a natural choice for an energy storage device in a system having a fuel cell, however, other energy storage devices can be used in addition to, or instead of, the battery system 22 in the system 10. Other types of energy storage devices include, without limitation, fluid power accumulators, springs, and fly wheels.

The motor/generator 13 is configured to either drive the axle 32 using power from the battery system 22 or the fuel cell 12, or draw power from the axle 32 for storage in the battery system 22. A motor/generator is an electric motor that can be run in reverse to act as a generator. The motor/generator 13 can be used to draw excess power from the engine 11.

The internal combustion engine 11 can be any type of internal combustion engine. A suitable engine can be, for example, a compression ignition engine or a spark ignition engine. The engine 11 can be designed for any particular type or types of hydrocarbon or oxygenated hydrocarbon fuel, including for example diesel, gasoline, natural gas, or methanol.

In one embodiment, the internal combustion engine 11 is operated in a manner that limits the NOx and particulate matter content of the exhaust. Any suitable method of operation can be used, depending on the particular limits. For example, some limits on NOx and particulate matter can be met by configuring the engine 11 to operate as a homogenous charge compression ignition (HCCI) diesel engine.

In one embodiment, the internal combustion engine 11 is configured to operate in a low temperature combustion mode. Low temperature combustion mode refers to engine operation where the engine still produces a significant amount of power, but with an adiabatic flame temperature sufficiently low that the engine exhaust contains little $NO_x$ and little particulate matter. The fuel-air mixture can be heterogeneous, as in a diesel engine where fuel is injected directly into cylinders after air compression. The fuel-to-air ratio can be anywhere in the range from lean to rich, except to the extent the fuel-to-air ratio is used to control the adiabatic flame temperature.

In the context of low temperature combustion mode, the adiabatic flame temperature refers to the highest local adiabatic flame temperature that can occur in an engine cylinder. For pre-mixed combustion, the adiabatic flame temperature is based on the entire fuel-air charge. For heterogeneous combustion, the adiabatic flame temperature is based on the fuel combined with a stoichiometric amount of air. The adiabatic flame temperature for low temperature combustion mode is generally about 2000 K or less, preferably about 1900 K or less, more preferably about 1800 K or less. Preferably, the engine still consumes at least about 50% of the fuel energy, more preferably at least about 70%, and most preferably at least about 85%.

By sufficiently lowering the adiabatic flame temperature, the exhaust can meet virtually any limits on $NO_x$ and PM production. Preferably, the adiabatic flame temperature is limited whereby the exhaust contains no more than about 0.4 g/bhp-hr NOx, more preferably no more than about 0.2 g/bhp-hr NOx. Preferably, the exhaust contains no more than about 0.04 g/bhp-hr particulate matter (PM), more preferably no more than about 0.01 g/bhp-hr particulate matter.

Although not necessary to meet the foregoing emission limits, it is an option to lower the adiabatic flame temperate to about 1500 K, at which temperate the engine 11 operates essentially as a fuel reformer while producing little useful power. This may be advantageous in that the fuel cell 12 can have a higher theoretical efficiency than the engine 11. The fraction of reformate in the exhaust can also be increased by running the engine 11 rich, subject to a limit where particulate emissions cease to be low.

The adiabatic flame temperature is generally limited by exhaust gas recirculation (EGR). The power generation system 10 has an external EGR loop selectively drawing exhaust from conduit 15 through EGR valve 16 and EGR cooler 17 to combine with charge air for the engine 11. This is an example of a high pressure external EGR loop in that recirculated exhaust is drawn from a high-pressure portion of the exhaust system, whereby the exhaust can flow to an intake of the engine 11 without being pressurized by a compressor. High-pressure exhaust can also be found downstream of the fuel cell 12 and an EGR stream can also be drawn from that location. Drawing EGR from downstream of the fuel cell 12 provides a cleaner recirculation stream, but forces the fuel cell 12 to process a larger volume and more dilute exhaust stream. This increases the required size for the fuel cell 12.

Instead of high pressure EGR, the engine 11 can use low pressure EGR. Low pressure EGR involves moving the recirculated exhaust through a compressor. In conventional systems, low pressure EGR generally requires a catalytic particulate filter to prevent fouling of the compressor. In the low temperature combustion mode, however, the exhaust is generally sufficiently low in particulates that a particulate filter is unnecessary. Low pressure EGR can draw exhaust from any part of the exhaust system, including for example, a relatively cool low pressure location such as downstream of the turbine 18 in the power generation system 10. Low pressure EGR has the advantage of being useable regardless of engine operating conditions, as opposed to high pressure EGR which can only be used at torque/speed conditions where there is a suitable pressure differential between the exhaust manifold and the engine intake.

A further EGR method that can be used instead of, or in addition to, the foregoing methods is internal EGR. Internal EGR is achieved through valve timing. In one mode of internal EGR, an exhaust valve closes before a cylinder empties on its exhaust stroke. In another mode, an exhaust valve opens during an intake stroke to draw exhaust from the exhaust manifold. In a further mode, an intake valve is opened during an exhaust stroke, whereby exhaust flows to the intake manifold. This later mode can result in undesirable heating of the intake manifold. To mitigate this, it is preferred that a heat exchanger be provided within the intake manifold if intake-side internal EGR is used. In such a case, the manifold is preferably designed with sufficient volume to retain the internally recirculated exhaust. Internal EGR is generally used selectively with variable valve timing, however, it can be set as a permanent timing feature particularly when the power generation system 10 is designed to operate the engine 11 at constant speed.

Any engine operating in low temperature combustion mode produces CO and unburned organic compounds. A low temperature combustion mode diesel engine in particular will exhaust substantial quantities of CO and unburned organic compounds. While some of the exhaust may be diverted for EGR, or possibly to a fuel reformer, the bulk of the exhaust is channeled by conduits 15 to the fuel side of the fuel cell 12.

The conduit 15 comprises one or more manifolds and/or pipes.

Within the fuel cell 12, CO and organic compounds are oxidized to water and $CO_2$ while producing useful power. The CO and unburned organic compound concentrations in the exhaust are preferably reduced substantially. In one embodiment, the fuel cell 12 removes at least about 50% of the CO in the exhaust. In another embodiment, the fuel cell removes at least about 80% of the CO. In a further embodiment, the fuel cell removes at least about 90% of the CO. Unburned organic compounds can also be removed in the foregoing percentages.

The fuel cell 12 can comprise any type of fuel cell. The fuel cell type can be, for example, a solid oxide fuel cell (SOFC), a molten carbonate fuel cell (MCFC), or a phosphoric acid fuel cell (PAFC). The term fuel cell as used herein is inclusive of devices comprising multiple individual fuel cells connected in parallel or in series. The fuel cell can have any suitable structure. Suitable structures include, for example, tubular and planar structures.

A fuel cell according to the invention can produce a significant amount of power during steady operation. The phrases a "significant amount of power during steady operation" and "significant useful power" are used herein to distinguish fuel cells that serve only as sensors, providing little power beyond what is required for their own operation.

Solid oxide fuel cells are generally characterized in terms of their electrolytes. Any suitable electrolyte can be used. Examples of electrolytes include stabilized zirconium, such as $Y_2O_3$ stabilized $ZrO_2$; ceria-based oxides, chlorides, and fluorides, such as gadolinium doped $CeO_2$; alumina electrolytes, such as chloride, fluoride, or sodium doped alumina; lanthanum electrolytes, such as strontium doped lanthanum maganite and lanthanum gallate; and doped bismuth oxides, such as bismuth vanadium cobalt oxide.

The anodes and cathodes can be of any suitable type. Suitable electrodes have low thermal mismatch with the electrolyte material. The cathode is electrically conductive, reacts with oxygen to form oxygen ions, and allows the ions to pass through to the electrolyte. Depending on the electrolyte, a suitable cathode material could be a porous lanthanum strontium maganite, a lanthanum strontium ferrite or lanthanum strontium cobalt ferrite. The anode is also electrically conductive and allows the passage of oxygen ions. A suitable anode material could be nickel. These exemplary anode and cathode material are commonly mixed with the electrolyte material, as this generally gives better performance.

A preferred fuel cell is an intermediate temperature solid oxide fuel cell. An intermediate temperature solid oxide fuel cell is a fuel cell operative at a temperature within the range from about 250 to about 600° C., more preferably within the range from about 400 to about 550° C. Being operative at a temperature means that the fuel cell can operate at that temperature with a substantial efficiency in terms of energy production from at least CO, over a substantial period.

Preferably, the fuel cell 12 operates near the same temperature as the exhaust leaving the internal combustion engine 11. Moreover, it is preferred that the exhaust be a relatively low temperature exhaust, such as produced by a diesel engine. Preferably, the exhaust can be supplied to the fuel cell 12 without heating between the engine 11 and the fuel cell 12. Preferably, the fuel cell 12 operates at a temperature within about 100° C. of the exhaust temperature, more preferably within about 50° C. Preferably, the engine exhaust can be used to heat the fuel cell 12 to its operating temperature.

The fuel cell 12 requires a source of oxygen. This source can be air, or a more concentrated form of oxygen. In one embodiment, the concentration of oxygen is increased by pressurizing air. In another embodiment, the concentration of oxygen is increased by separating oxygen from air. A suitable process for separating oxygen from air can be a membrane separation process or an adsorptive separation, for example. The foregoing embodiments can be combined, providing pressurized oxygen to the fuel cell 12.

In a preferred embodiment, the fuel cell 12 is an intermediate temperature solid oxide fuel cell (ITSOFC) that has an electrolyte that conducts protons. Examples of ITSOFC electrolytes that conduct protons include perovskites such as $BaZrO_3$ (optionally doped with Y), $BaCeO_3$, and $SrCeO_3$. A typical operating range for this type of fuel cell is from about 400 to about 700° C. The anode can be provided with a material that generates protons from fuel gases. Suitable anode materials include Group VIII metals, such as Ni and Pt.

When a fuel cell 12 has an electrolyte that conducts protons, water can be formed on the airside. In the power generation system 10, this water is recovered in condenser 23. An advantage of obtaining water from this source is that it provides water with a relatively neutral pH. Water condensed from the main exhaust stream is generally acidic and causes corrosion. A water source has various potential uses on a vehicle. In the power generation system 10, the water is stored in reservoir 24 and transferred by pump 25 for use in the fuel reformer 14. The exhaust from the air side of the fuel cell 12 can also be channeled directly to the reformer 12, whereby the water can be used without condensation, storage, and pumping.

The reformer 14 can be any type of reformer. Reformers can be characterized in terms of the amount and types of oxidant sources supplied and the steps taken to promote reaction. The oxidant source is generally either oxygen or water. Oxygen can be supplied from air, from lean exhaust, or in a relatively pure form, as in oxygen produced from hydrogen peroxide or water. Partial oxidation by oxygen is exothermic and partial oxidation by water in endothermic. A balance between the twp can be selected to achieve a desired degree of heat release, heat consumption, or an energy neutral reaction in the reformer 14. The reformer 14 can promote reaction with one or more of heat, a catalyst, and plasma. Plasma is typically generated with an electric arc. Specific reformer types include steam reformers, autothermal reformers, partial oxidation reformers, and plasma reformers.

Reforming breaks heavier hydrocarbons into light hydrocarbons and oxygenated hydrocarbons, CO, and water. These compounds can be used by the fuel cell 12 to generate power. In the power generation system 10, the reformate can be injected into the manifold 15 to increase power output from the fuel cell 12. A reformer/fuel cell combination has a potentially higher efficiency than an engine/fuel cell combination, whereby more power may be obtained from fuel channeled through the reformer 14 and the fuel cell 12 when these are at operating temperature than fuel channeled through the internal combustion engine 11 and the fuel reformer 14. Injecting fuel into the manifold 15 also provides a means of increasing the rate of power generation without changing the operation of the engine 11. It is also possible to provide reformate to the engine 11 and thereby produce a cleaner exhaust.

In the power generation system 10, a turbine 18 recovers energy from the exhaust. The turbine 18 can, for example, drive a compressor 20 to provide turbo-charging for the engine 11. The compressed air charged to the engine 11 can first be cooled in a charge air cooler 21. Compressed air can also be provided to the fuel cell 12 and the reformer 14.

Ideally, the fuel cell 12 removes sufficient amounts of CO and hydrocarbons to meet emission regulations, but optionally, an oxidation catalyst 26 can be used to further reduce the concentrations of these species. The oxidation catalyst 26 can be a three-way catalyst such as used in automobile exhaust systems. A three-way catalyst oxidizes unburned hydrocarbons and CO, while reducing NO. In a preferred embodiment, however, the exhaust has very little NOx and the oxidation catalyst 26 need only provide oxidation. A suitable oxidation catalyst is a precious metal, such as platinum.

Where an oxidation catalyst 26 is used, oxygen must be available in the exhaust. Oxygen will be available if the engine 11 is run lean. If the engine 11 is not run lean, an oxygen-containing gas can be injected into the exhaust. The compressor 20 can also provide air for injecting oxygen into the exhaust of the fuel cell 12.

By increasing the size of the fuel cell 12, or using the fuel cell 12 with a sufficiently large oxidation catalyst 26, the exhaust can be treated to meet virtually any limit on CO production or the production of an organic compound group. An organic compound group can be total unburned hydrocarbons and oxygenated hydrocarbons, non-methane organic gases (NMOG), non-methane hydrocarbons (NMHC), or formaldehyde, for example. Preferably, the treated exhaust contains no more than about 4.0 g/bhp-hr CO, more preferably no more than about 2.0 g/bhp-hr CO. Preferably the treated exhaust contains no more than about 0.28 g/bhp-hr NMOG, more preferably no more than about 0.14 g/bhp-hr.

With regard to regard to designing a system to meet particular emission standards, it is noted that some standards are expressed in terms of g/ml based on a particular test protocol. The factor, CF, for converting from g/bhp-hr to g/ml is given by the formula:

$$CF = \rho/BSFC*FE$$

where $\rho$ is the fuel density in lb/gal, BSFC is the brake-specific fuel consumption in lb/bhp-hr, and FE is the fuel economy in mi/gal. Typical conversion factors for gasoline-powered passenger cars are around 0.6, whereas typical conversion factors for diesel-powered buses and trucks are in the range from about 2 to about 4.

In another embodiment of the invention, the engine 11 is allowed to produce some NOx, which is removed by a reducing catalyst located between the engine 11 and the fuel cell 12. Preferably the engine 11 is run in a mode that produce little or no particulate matter. On the other hand, the engine 11 can be allowed to produce significant amounts of CO and unburned hydrocarbons. Preferably, the concentration of one or more of these species is high in comparison to the NOx concentration, whereby there is an excess of reductant available for reducing NOx over the reducing catalyst. In this embodiment, the engine 11 is preferably operated with a stoichiometric or rich fuel-to-air ratio, whereby the exhaust is low in oxygen, which can interfere with the reducing reactions.

The reducing catalyst can be any catalyst that reduces NOx by reaction with one or more exhaust gas constituents selected from the group consisting of $H_2$, CO, and hydrocarbons. A three-way catalyst, such as commonly used in passenger vehicle exhaust systems can be used, or a catalyst proposed for use in regenerating a nitrogen trap. The catalyst can be, for example, one or more precious metals, such as Au, Ag, and Cu, group VIII metals, such as Pt, Pd, Ru, Ni, and Co, Cr, Mo, or K. The reducing catalyst 14 can also include an NOx adsorbant, although this is not generally necessary. The catalyst can be a lean-NOx catalyst, provided a satisfactory catalyst can be found for a particular application.

An advantage of placing a reducing catalyst between the engine 11 and the fuel cell 12 is that ample reducing agent can be provided to the reducing catalyst 14 without incurring a fuel penalty. Excess reducing agent can be used by the fuel cell 12 in energy production with even higher efficiency than if that same fuel were provided to the engine 11. With respect to a diesel power generation system, the engine does not have to be run lean, because the usual consequences of lean operation—high emissions and low efficiency—can be eliminated by the fuel cell 12. Even with respect to gasoline powered systems there is an advantage in that excess reductant can be provided without a fuel penalty. An excess of reductant improves the reduction efficiency of a reducing catalyst, decreasing its required size, cost, and warm-up time.

Where NOx is removed by a reducing catalyst, PM production can be limited in any suitable manner. For example, in a conventional diesel engine, PM production can be limited by increasing the adiabatic flame temperature. PM production can also be reduced by homogenizing all or part of a fuel-air charge. Preferably, the exhaust contains no more than about 0.04 g/bhp-hr PM, more preferably no more than about 0.01 g/bhp-hr particulate matter.

The battery system 22 comprises one or more batteries. Preferably, the battery system 22 has a large storage capacity and peak output, whereby the energy provided by the battery system 22 can be comparable to the total output of the power generation system 10 for a period of about 15 minutes or more, more preferably half an hour or more.

Preferably, the power generation system 10 is adapted to provide power and low emissions on start-up. One method of cold start operation is to pre-heat the fuel cell 12 and/or the oxidation catalyst 26 before starting the engine 11. This would take about 30 seconds. During this time, the system can provide shaft power through motor/generator 13 if the battery system 22 has sufficient capacity.

Another method of cold start operation is to run the engine 11 in a conventional mode during warm-up. A higher level of NOx and PM production can be tolerated during warm-up if the average NOx and PM production levels meet regulations. The power generation system 10 includes a bypass valve 19 for bypassing the fuel cell 12 during warm-up. Bypassing the fuel cell 12 prevents fouling of the fuel cell 12 while the engine 11 is producing a high concentration of particulate matter. If desired, the engine exhaust can still be used to heat the fuel cell 12 during bypass mode by providing heat exchange between the bypass conduit 27 and the fuel cell 12.

The bypass valve 19 can have other purposes. Generally, it is valuable to make fuel-saving and exhaust clean-up devices transparent to the user. In certain configurations, for example when the fuel cell 12 is large to provide a high degree of exhaust clean up, the fuel cell 12 can exert significant back-pressure on the engine 11. This backpressure could be noticeable during periods of high power demand. The bypass valve 19 can be used to relieve this backpressure during periods where it might otherwise be noticeable.

The invention has been shown and described with respect to certain aspects, examples, and embodiments. While a particular feature of the invention may have been disclosed with respect to only one of several aspects, examples, or embodiments, the feature may be combined with one or more other features of the other aspects, examples, or embodiments as may be advantageous for any given or particular application.

The invention claimed is:

1. A method of operating a power generation system, comprising:
   operating a direct injection compression-ignition diesel-powered internal combustion engine in a low temperature combustion mode to drive an axle and produce an exhaust stream comprising CO;
   fueling a solid oxide fuel cell with at least the exhaust stream to produce electrical power, the fuel cell removing at least 50% of the CO from the exhaust stream
   storing electrical power produced by the fuel cell in an energy storage system;
   at times, driving the axle with an electric motor while powering the electric motor with the fuel cell or the energy storage system;
   at different times, taking up power from the axle by having the axle drive the electric motor to produce electrical power; and
   in a manner that tends to stabilize the engine operation and allows the engine to remain in the low temperature combustion mode regardless of demands for power to drive the axle, responding to fluctuations in demands for power to drive the axle by increasing or decreasing power output from the fuel cell and/or increasing or decreasing power uptake or output from an energy storage device;
   wherein the fuel cell produces a substantial amount of power from the exhaust stream;
   the low temperature combustion mode is a mode in which the engine produces a significant amount of torque, but with combustion temperatures sufficiently low that the exhaust contains little or no $NO_x$ and little or no particulate matter.

2. The method of claim 1, wherein the engine is operated with a relatively constant power output while the power demand fluctuates substantially.

3. The method of claim 1, wherein power from the engine in excess of demand is captured for storage.

4. The method of claim 3, wherein the power is captured by a generator and stored in a battery system.

5. The method of claim 1, wherein the engine operates with relatively constant exhaust temperature while the power demand fluctuates widely.

6. The method of claim 1, wherein:
   the power generation system operates to meet emission control regulations including keeping average $NO_x$ emissions at 0.4 g/bhp-hr NOx or less and average PM emissions at 0.04 g/bhp-hr PM or less using the low temperature combustion mode without requiring or using a particulate filter.

7. The method of claim 6, wherein the engine is operated with direct injection of fuel into engine cylinders containing compressed air, whereby combustion is heterogeneous.

8. The method of claim 7, wherein the exhaust from the fuel cell optionally after treatment by an oxidation catalyst, contains no more than about 0.28 g/bhp-hr NMHC.

9. The method of claim 8, wherein the optionally treated fuel cell exhaust contains no more than about 0.2 g/bhp-hr NOx, no more than about 0.01 g/bhp-hr PM, and no more than about 0.14 g/bhp-hr NMHC.

10. The method of claim 7, wherein the engine is operated with stoichiometric to rich fuel-to-air ratios.

11. The method of claim 1, wherein the fuel cell is operative at a temperature between about 250 and about 550° C.

12. The method of claim 1, wherein the fuel cell operates at a temperature within about 100° C. of the exhaust temperature.

13. A power generation system, comprising:
   an axle;
   a direct injection compression-ignition diesel-powered internal combustion engine operative in low temperature combustion mode to produce an engine exhaust comprising CO and configured to provide shaft power to drive the axle;
   a fuel cell having an air side and a fuel side, the fuel cell being operative to remove at least 50% of the CO in the exhaust while producing useful power;
   an energy storage device configured to store energy produced by the fuel cell; and
   an electric motor that can be powered by the fuel cell or the energy storage device, the electric motor being configured to drive the axle or be driven by the axle; wherein
   the system is configured to keep the engine operating in low temperature combustion mode regardless of demands for shaft power to drive the axle and to respond to such demands by one or more of increasing power output from the fuel cell, increasing power output from the energy storage device, and decreasing power uptake from the energy storage device; and
   the system is configured to respond to decreases in demands for shaft power to drive the axle by one or more of decreasing power output from the fuel cell, increasing power uptake by the energy storage device, and decreasing power output from the energy storage device;
   wherein the engine is configured to operate, after warm-up exclusively in low temperature combustion mode; and
   the low temperature combustion mode is a mode in which the engine produces a significant amount of torque, but with combustion temperatures sufficiently low that the exhaust contains little or no $NO_x$ and little or no particulate matter.

14. The power generation system of claim 13, wherein the energy storage device is a battery system that can provide power to the electric motor.

15. The power generation system of claim 13, wherein the system is configured to respond to fluctuations in demands for shaft power to drive the axle while fueling the engine at an essentially constant rate.

16. The power generation system of claim 13, wherein the system is configured to operate after warm-up with the fuel cell at a temperature within about 100° C. of the engine exhaust temperature.

17. The power generation system of claim 13, wherein the fuel cell is operative at a temperature between 250 and 550° C.

18. The power generation system of claim 13, wherein the engine is configured to operate without any pre-mixing of fuel and air, whereby combustion within the engine is heterogeneous.

19. The power generation system of claim 13, wherein the engine is configured to operate with stoichiometric to rich fuel-to-air ratios.

20. The power generation system of claim 13, further comprising an external EGR system configured to draw exhaust from upstream of the fuel cell.

21. The power generation system of claim 13, further comprising an oxidation catalyst configured to treat exhaust from the fuel cell.

22. A vehicle comprising the power generation system of claim 13.

* * * * *